US010365902B2

United States Patent
Slesarenko et al.

(10) Patent No.: US 10,365,902 B2
(45) Date of Patent: Jul. 30, 2019

(54) METHOD FOR COMPILING A SOURCE CODE

(71) Applicant: Huawei Technologies Co., Ltd., Shenzhen (CN)

(72) Inventors: Alexander Vladimirovich Slesarenko, Moscow (RU); Alexey Romanov, Moscow (RU); Hongbo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/445,706

(22) Filed: Feb. 28, 2017

(65) Prior Publication Data
US 2017/0177313 A1 Jun. 22, 2017

Related U.S. Application Data

(63) Continuation of application No. PCT/RU2014/000652, filed on Aug. 29, 2014.

(51) Int. Cl.
*G06F 9/44* (2018.01)
*G06F 9/445* (2018.01)
(Continued)

(52) U.S. Cl.
CPC .............. *G06F 8/44* (2013.01); *G06F 8/311* (2013.01); *G06F 8/41* (2013.01)

(58) Field of Classification Search
CPC .. G06F 8/41; G06F 8/30–41; G06F 8/44–447; G06F 8/311–44
See application file for complete search history.

(56) References Cited

U.S. PATENT DOCUMENTS

| | | | |
|---|---|---|---|
| 6,292,938 B1 * | 9/2001 | Sarkar | G06F 8/47 717/138 |
| 6,760,903 B1 * | 7/2004 | Morshed | G06F 11/3466 717/130 |

(Continued)

FOREIGN PATENT DOCUMENTS

| | | |
|---|---|---|
| CN | 102171654 A | 8/2011 |
| CN | 102177502 A | 9/2011 |

(Continued)

OTHER PUBLICATIONS

Arvind K. Sujeeth, Forge: Generating a High Performance DSL Implementation from a Declarative Specification, 2013, pp. 1-10 https://dl.acm.org/citation.cfm?id=2517220 (Year: 2013).*

(Continued)

*Primary Examiner* — Mongbao Nguyen
(74) *Attorney, Agent, or Firm* — Leydig, Voit & Mayer, Ltd.

(57) ABSTRACT

The invention relates to a method for compiling a source code to a program code, the method comprising: providing a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph, replacing the pattern graph by the replacement graph assigned to the pattern graph, and generating the program code based on the replacement graph.

8 Claims, 5 Drawing Sheets

(51) Int. Cl.
G06F 9/45 (2006.01)
G06F 8/41 (2018.01)
G06F 8/30 (2018.01)

(56) References Cited

U.S. PATENT DOCUMENTS

| | | | | |
|---|---|---|---|---|
| 8,001,607 | B2* | 8/2011 | Stull | H04L 9/00 706/14 |
| 8,539,463 | B2* | 9/2013 | De | G06F 9/4552 717/146 |
| 9,182,957 | B2* | 11/2015 | Craymer | G06F 8/443 |
| 9,372,678 | B2* | 6/2016 | Bikshandi | G06F 7/4806 |
| 10,157,239 | B2* | 12/2018 | Hong | G06F 16/9024 |
| 2005/0268293 | A1* | 12/2005 | Kawahito | G06F 8/4434 717/154 |
| 2007/0094646 | A1* | 4/2007 | Higham | G06F 8/44 717/136 |
| 2007/0240135 | A1* | 10/2007 | Stoodley | G06F 9/45516 717/140 |
| 2007/0277162 | A1* | 11/2007 | Tanaka | G06F 8/4441 717/140 |
| 2008/0028380 | A1* | 1/2008 | Guo | G06F 8/433 717/151 |
| 2008/0091926 | A1* | 4/2008 | Kawahito | G06F 8/445 712/226 |
| 2008/0275829 | A1* | 11/2008 | Stull | H04L 9/00 706/17 |
| 2009/0235238 | A1* | 9/2009 | Stoodley | G06F 8/427 717/140 |
| 2010/0088669 | A1 | 4/2010 | Cwalina et al. | |
| 2010/0088686 | A1 | 4/2010 | Langworthy et al. | |
| 2010/0125836 | A1* | 5/2010 | Sazegari | G06F 8/4443 717/151 |
| 2010/0268722 | A1* | 10/2010 | Yalamanchi | G06F 16/9024 707/759 |
| 2011/0055805 | A1* | 3/2011 | Herdeg | G06F 9/45525 717/106 |
| 2011/0225572 | A1* | 9/2011 | Stoicescu | G06F 8/4434 717/156 |
| 2012/0159459 | A1* | 6/2012 | Turner | G06F 8/314 717/138 |
| 2012/0222014 | A1* | 8/2012 | Peretz | G06F 11/3684 717/125 |
| 2013/0031536 | A1* | 1/2013 | De | G06F 8/427 717/146 |
| 2014/0019949 | A1* | 1/2014 | Craymer | G06F 8/443 717/150 |
| 2014/0189661 | A1* | 7/2014 | Wuerthinger | G06F 9/4552 717/139 |
| 2014/0359585 | A1* | 12/2014 | Marvie | G06F 8/41 717/139 |
| 2016/0098258 | A1 | 4/2016 | Craymer, III | |
| 2016/0110171 | A1* | 4/2016 | Bikshandi | G06F 7/4806 717/160 |

FOREIGN PATENT DOCUMENTS

| | | |
|---|---|---|
| CN | 104662513 A | 5/2015 |
| WO | WO 2015012711 A1 | 1/2015 |
| WO | WO 2016105225 A1 | 6/2016 |

OTHER PUBLICATIONS

Cliff Click, A Simple Graph-Based Intermediate Representation, 1995, pp. 35-48. https://www.oracle.com/technetwork/java/javase/tech/c2-ir95-150110.pdf (Year: 1995)*

Tiark Rompf, Optimizing Data Structures in High-Level Programs, 2013, pp. 1-14. https://dl.acm.org/citation.cfm?id=2429128 (Year: 2013).*

D. Obermann, Two-Way-Compiler: Additional Data Saving for Generating the Original Source Code of a Binary Program, 2012, pp. 1-4. https://ieeexplore.ieee.org/stamp/stamp.jsp?tp=&arnumber=6222219 (Year: 2012).*

Arvind K. Sujeeth, Composition and Reuse with Compiled Domain-Specific Languages, 2013, pp. 1-25. https://ieeexplore.ieee.org/stamp/stamp.jsp?tp=&arnumber=6569815 (Year: 2013).*

Brown et al., "A Heterogeneous Parallel Framework for Domain-Specific Languages," 2011 International Conference on Parallel Architectures and Compilation Techniques, pp. 89-100, Institute of Electrical and Electronic Engineers, New York, New York (2011).

Click et al., "A Simple Graph-Based Intermediate Representation," IR'95 Papers from the 1995 ACM SIGPLAN workshop on Intermediate representations, San Francisco, California (Jan. 22, 1995).

Jones et al., "Playing by the Rules: Rewriting as a practical optimization technique in GHC," Preliminary Proceedings of the 2001 ACM SIGPLAN Haskell Workshop, pp. 1-13, Firenze, Italy (Sep. 2, 2001).

Rompf et al., "Optimizing Data Structures in High-Level Programs," 40th ACM SIGPLAN-SIGACT Symposium on Principles of Programming Languages, Rome, Italy (Jan. 23-25, 2013).

Slesarenko, "Lightweight Polytypic Staging: a new approach to Nested Data Parallelism in Scala," The Third Annual Scala Workshop, London, United Kingdom (Apr. 17-18, 2012).

"Stratego/XT," Stratego Program Transformation Language, https://strategoxt.org/Stratego (Downloaded Jul. 18, 2017).

Sujeeth et al., "Delite: A Compiler Architecture for Performance-Oriented Embedded Domain-Specific Languages," ACM Transactions on Embedded Computing Systems, vol. 13, No. 4s, Article 134, pp. 1-25, Association for Computing Machinery, New York, New York (Mar. 2014).

The GHC Team, "7.19. Rewrite rules; Chapter 7. GHC Language Features," The Glorious Glasgow Haskell Compilation System User's Guide, Version 7.6.3, https://downloads.haskell.org/~ghc/7.6.3/docs/html/users_guide/rewrite-rules.html (Downloaded Jul. 18, 2017).

* cited by examiner

METHOD FOR COMPILING A SOURCE CODE

CROSS-REFERENCE TO RELATED APPLICATIONS

This application is a continuation of International Application No. PCT/RU2014/000652, filed on Aug. 29, 2014, the disclosure of which is hereby incorporated by reference in its entirety.

BACKGROUND OF THE INVENTION

Domain-Specific Languages (DSL) are programming languages specialized to a particular application domain. A possible framework for constructing compiled DSLs can comprise creating a DSL by an author, implementing the DSL and using the DSL by an application developer to obtain an application program. This allows consumers of DSLs such as application developers to program at a very high level, while producing optimized code.

To produce and optimize compiled programs, program transformation can be used, which takes an abstract syntax tree (AST) of the program as input and produces another AST. A rewrite rule is a specific kind of such transformation, which describes a pattern of tree fragments and transforms every fragment which matches this pattern into an output fragment, keeping everything else in place. The rewrite rules are important for program optimization, and some DSLs may include up to tens or hundreds of rules.

However, the known systems for describing rewrite rules do not support programs creating new rules or transforming existing rules. Moreover, often separate languages are used for describing the language being developed and the rewrite rules. Therefore, it is desirable to enable the DSL or application developer to easily add or change rewrite rules.

SUMMARY OF THE INVENTION

It is the object of the invention to provide an efficient compiling concept to obtain a program code.

This object is achieved by the features of the independent claims. Further implementation forms are apparent from the dependent claims, the description and the figures.

The invention is based on the finding that the above identified object can be obtained when a compiler such as the DSL compiler supports optimisations such as rewriting rules or other optimisations.

According to a first aspect, the invention relates to method for compiling a source code to a program code, the method comprising providing a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph, replacing the pattern graph by the replacement graph assigned to the pattern graph; and generating the program code based on the replacement graph.

In a first possible implementation form of the method according to the first aspect, the pattern graph is replaced by the corresponding replacement graph when the specific replacement rule is set active in the compiling.

In a second possible implementation form of the method according to one of the preceding implementation forms or according to the first aspect as such, instances of the pattern graph are registered together with their corresponding replacement graphs in a rule component of the set of rules.

In a third possible implementation form of the method according to the second implementation form, the method comprises detecting instances of the pattern graph in the intermediate representation of the source code by looking up the rule component of the set of rules and replacing the instances of the pattern graph with their corresponding replacement graphs registered in the rule component.

In a fourth possible implementation form of the method according to one of the preceding implementation forms or according to the first aspect as such, the first programming language comprises a domain specific language.

In a fifth possible implementation form of the method according to one of the preceding implementation forms or according to the first aspect as such the intermediate representation of the source code comprises an graph-based data structure representing the source code.

In a sixth possible implementation form of the method according to one of the preceding implementation forms or according to the first aspect as such the intermediate representation of the source code comprises a first layer of nodes comprising expressions.

In a seventh possible implementation form of the method according to one of the preceding implementation forms or according to the first aspect as such, the pattern graph is generated such that the pattern graph matches the intermediate representation of the source code.

In an eighth possible implementation form of the method according to the seventh implementation form, the pattern graph is generated such that a number of nodes of the first layer of nodes of the pattern graph matches a number of nodes of the first layer of nodes of the intermediate representation of the source code; and such that the binary operations of the further layers of nodes of the pattern graph match the binary operations of the further layers of nodes of the intermediate representation of the source code.

In a ninth possible implementation form of the method according to the eighth implementation form, the replacement graph comprises a first layer of nodes comprising expressions, in particular variables which first layer of nodes is concatenated with further layers of nodes comprising binary operations, wherein the replacement graph has a same number of nodes of the first layer of nodes as the pattern graph and at least one different binary operation in the further layers of nodes.

In a tenth possible implementation form of the method according to one of the preceding implementation forms or according to the first aspect as such, the specific replacement rule is registered as a rule component comprising the pattern graph and the replacement graph in the set of rules of the first programming language.

According to a second aspect, the invention relates to a compiler operable on a processor, the compiler being configured to compile a source code to a program code, the compiler comprising a pattern graph provider configured to provide a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph, a replacement unit configured to replace the pattern graph by the replacement graph assigned to the pattern graph, and a code generator configured to generate the program code based on the replacement graph.

In a first possible implementation form of the compiler to the second aspect, the compiler is configured to compile a source code in a domain specific language specialized to a particular application domain to a program code in a second programming language which second programming language is executable on a processor.

In a second possible implementation form of the compiler according to one of the preceding implementation forms or according to the second aspect as such, the compiler comprises a staged evaluator configured to perform a staged evaluation of the set of rules and to create the intermediate representation of the source code according to the set of rules.

In a third possible implementation form of the compiler according to one of the preceding implementation forms or according to the second aspect as such, the pattern graph provider forms a staged evaluator being configured to perform staged evaluation of the first programming language, wherein a result of the staged evaluation is a program graph forming an intermediate representation of the source code. Thereby, the program graph can be used to construct both pattern graph and replacement graph.

According to a third aspect, the invention relates to a domain specific framework system, comprising a rule specification unit configured to create a set of rules in a first programming language, wherein the set of rules comprises a specific replacement rule directing a pattern graph to be replaced by a corresponding replacement graph assigned to the pattern graph, a rule components unit, the rule components unit comprises a plurality of pattern graphs and for each pattern graph a corresponding replacement graph assigned to the pattern graph by the rule specification unit, and a staged evaluator configured to perform a staged evaluation of the set of rules and to create an intermediate representation of a source code according to the set of rules.

BRIEF DESCRIPTION OF DRAWINGS

Further embodiments of the invention will be described with respect to the following figures, in which.

DETAILED DESCRIPTION OF EMBODIMENTS OF THE INVENTION

Figure 1:
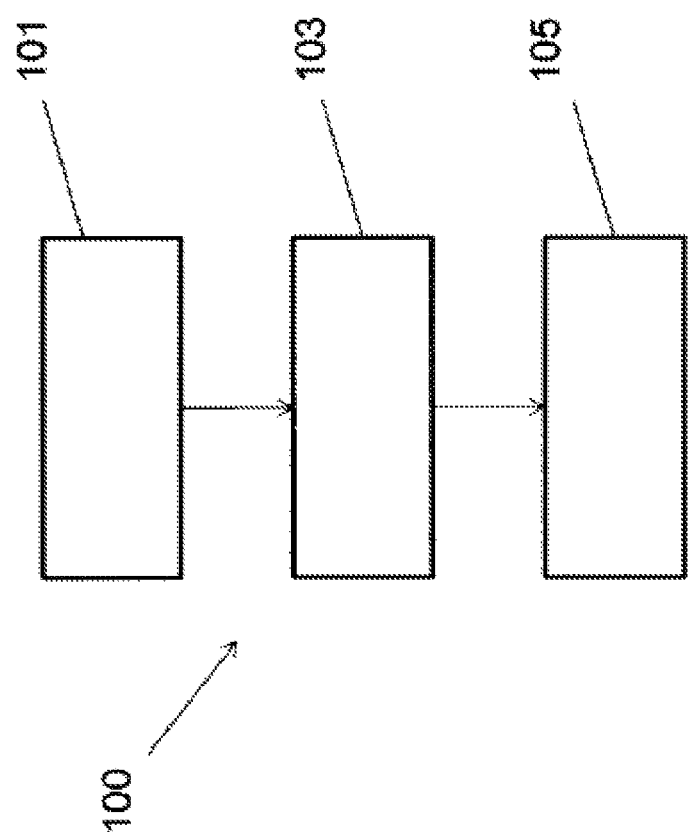
FIG. 1 shows a diagram of a method for compiling a source code to a program code according to an implementation form.

FIG. 1 shows a method 100 for compiling a source code to a program code, the method comprising providing 101 a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph, replacing 103 the pattern graph by the replacement graph assigned to the pattern graph and generating 105 the program code based on the replacement graph.

Thereby, writing rules without extra code can be performed. Moreover, an extension if an existing DSL with new rules can be performed. The rules can further be written in any language which supported by the DSL framework. Moreover, cross-DSL rules and testing of rules can be supported.

According to some implementation forms, staged DSL framework used to write rule specification. Furthermore, a staged evaluator can be used, which partially evaluates rule specification and creates intermediate representation.

According to some implementation forms, a rule component can comprise two graph IRs: Pattern Graph and Replacement Graph.

The algorithm according to some implementation forms recognizes instances of registered Pattern Graphs and replaces them with corresponding Replacement Graphs.

According to some implementation forms, the following method can be performed:

In a method step, the developer specifies the rewriting rule in any combination of existing DSLs. In a further method step, the staged evaluator creates graph IR of the rule. In a further method step, this graph IR is split into Pattern Graph and Replacement Graph. Both graphs can be packaged as a Rule Component and registered in the DSL framework. When programs are compiled using the DSL framework, any subgraphs of their IR matching Pattern Graphs of registered Rule Components can be detected and replaced by Replacement Graphs.

According to some implementation forms, a rewrite rule consists of a pattern which should be detected in input code and what every instance of this pattern should be replaced with.

As an example, the distributive law for integers can be considered abstractly as follows:

$$\forall x,y,z: Zx \cdot y + x \cdot z = x \cdot (y+z)$$

Hereby, every time the compiler can encounter a piece of code that matches the left-hand side while constructing the intermediate representation of our program it shall be replaced by the right-hand side. In this way the number of operations in the resulting code can be decreased, and other opportunities for optimization can be exposed (e.g. if both y and z are constants).

According to some implementation forms, this rule will be specified as
```
rule { (x: Rep[Int], y: Rep[Int], z: Rep[Int]) =>
    x * y + x * z ==> x * (y + z)
}
```

Figure 2:
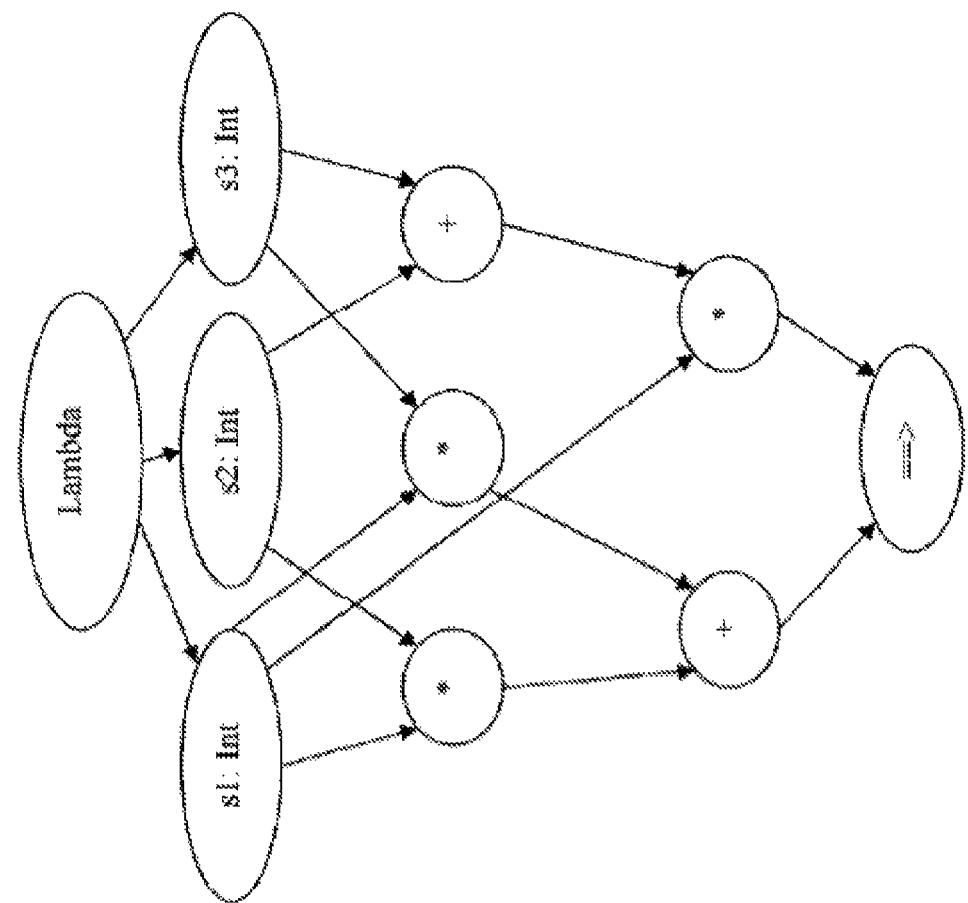
FIG. 2 shows a graph according to an implementation form.

According to some implementation forms, this can be done by the DSL developer as part of a trait which defines the DSL. Rep[Int] is the type of staged values of type Int, i.e. symbols which will have type Int (or its equivalent in the generated language) in the program output by the compiler. The operations * and + are the usual numeric operations on Rep[Int]. The operations rule and ==> are functions added to the MetaDSL framework for our solution. The operation ==> creates a graph node which is represented as a binary operation. The operation rule first compiles the Scala function it receives, producing the graph shown in FIG. 2 indicating compiled rule initial representation according to an implementation.

The variables s1, s2, and s3 are variables, all other graph nodes correspond to binary operations. This graph can be split into two parts corresponding to the left and right parts of ==>: pattern graph and replacement graph.

Finally, this pair of graphs is stored in the collection of Rewrite Rules of the DSL framework.

Figure 3:
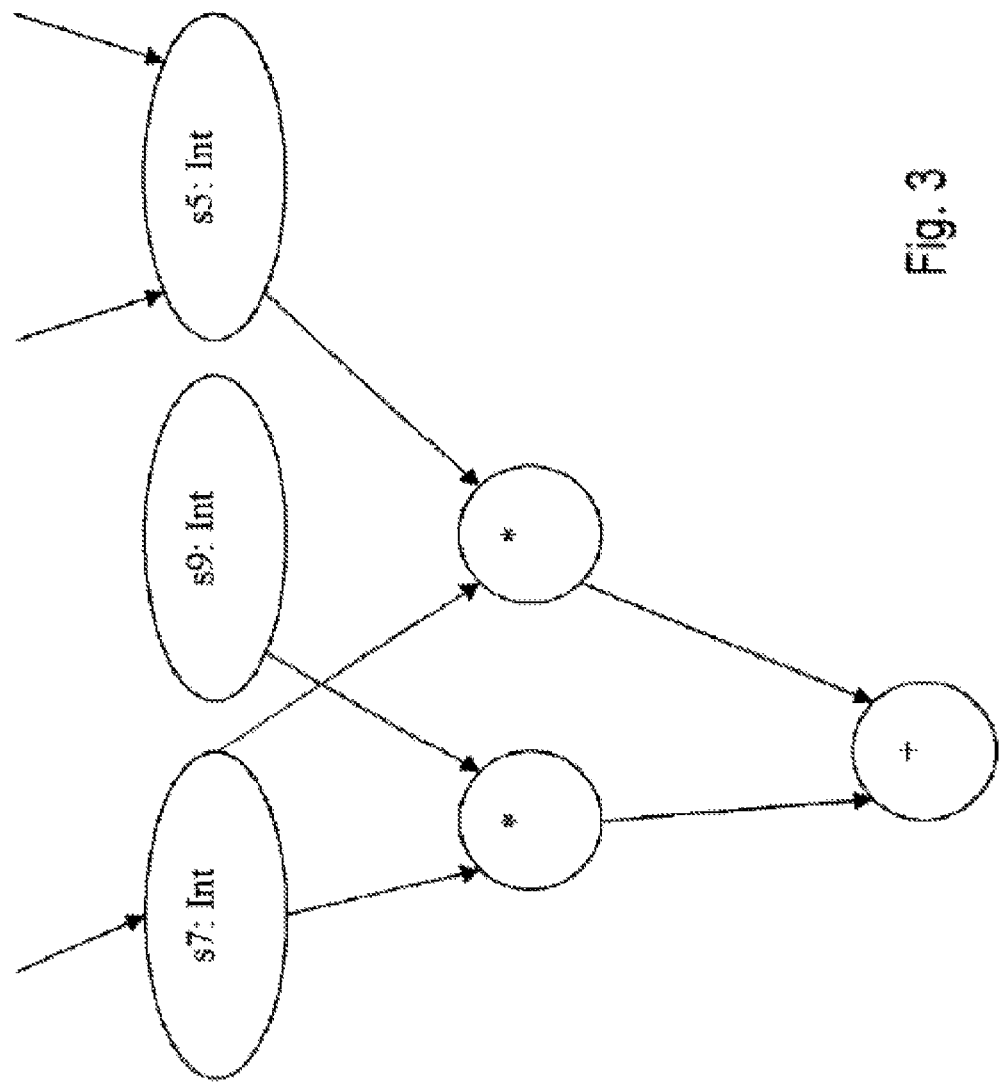
FIG. 3 shows a pattern graph according to an implementation form.

Later on, an application developer can writes code part of which has the same graph representation as the pattern graph shown in FIG. 3.

As shown by the incoming arrows, s7, s9, and s5 are not necessarily variables, but can be arbitrary expressions. When every non-variable node is created by the Staged Evaluator, it can be checked against all rules in the collection. Here s7, s9, and s5 are already created and so any relevant rules have been applied while creating them. In this case when creating the two * nodes, they will not match the + node in the root of the pattern graph (but may still match other rules).

Figure 4:
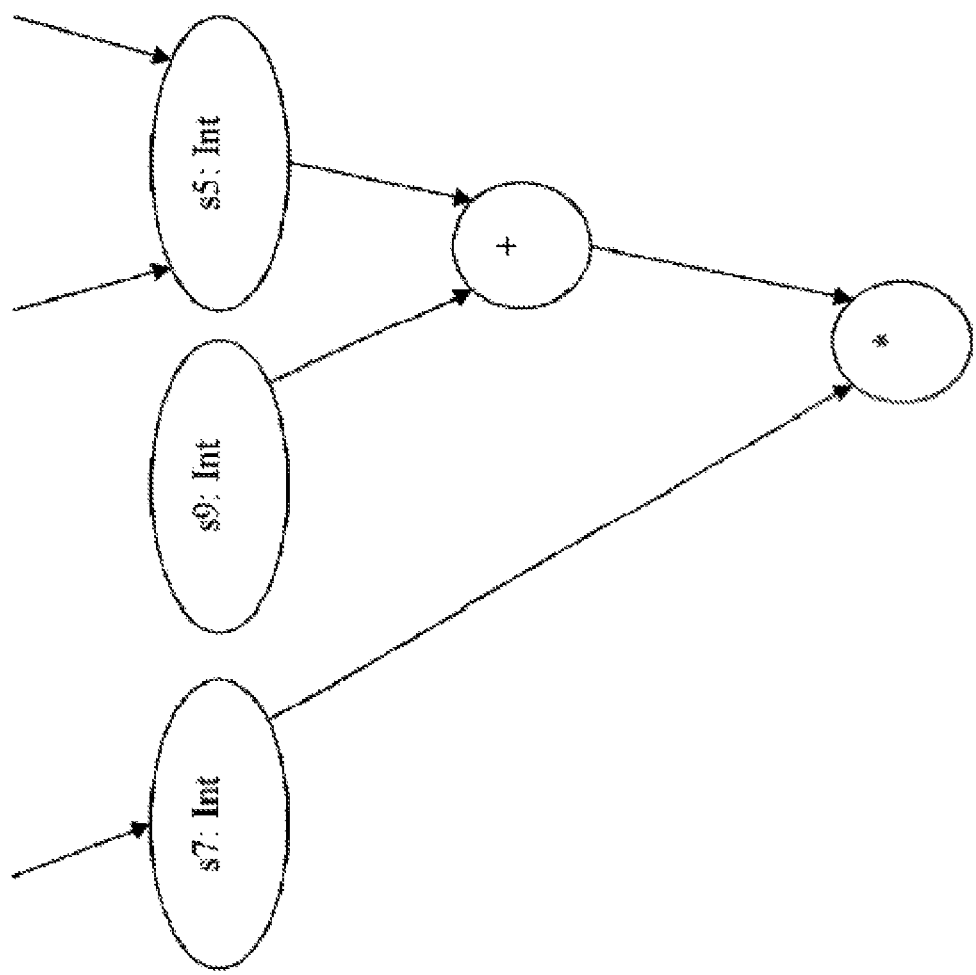
FIG. 4 shows generating a replacement graph according to an implementation form.

When the + node is created, it matches the + node in the pattern graph. Therefore, the two * nodes are recursively compared with the * nodes in the pattern graph and again found to match them. Finally, nodes s7, s9, and s5 correspond to variables in the element graph and so only their types need to be compared. The comparison succeeds and the substitution {s1→s7, s2→s9, s3→s5} is returned by the matcher. It is applied to the replacement graph, wherein generating the replacement graph is shown in FIG. 4.

According to some implementation forms, the new + and * nodes are again matched against all stored rules. Therefore when the final graph is produced all possible rules have been applied.

According to some implementation forms, a staged DSL framework is provided which can be used to create Rule Specifications. Further, a staged evaluator can be provided which performs staged evaluation of the rule specifications and creates graph-based IR of the rule. According to some implementation forms, a rule component contains Pattern Graph and Replacement Graph IRs and which is registered in DSL framework for rewriting. Furthermore, a behavior of the rule that can recognize instances of Pattern Graphs and replace them with Replacement Graph can be provided.

According to some implementation forms, the method can have the following steps:
1. Specify rewriting rule using any combination of existing DSLs, e.g. spec(a,b,c)=a*b+a*c==>a*(b+c)
2. Build graph-based IR by staged evaluation of rule specification, e.g. rule(a,b,c)
s1=a*b
s2=a*c
s3=s1+s2
s4=b+c
s5=a*s4
res=s3==>s5
3.
4. Split Rule Graph into Pattern Graph (which represents the pattern to recognize), e.g.
pattern(a,b,c)
s1=a*b
s2=a*c
s3=s1+s2
and Replacement Graph (which will replace recognized instances of the pattern), e.g. replacement(a,b,c)
s4=b+c
s5=a*s4

5. Package this pair of graph IRs as a component of the DSL description and store it in the collection of all rewrite rules.
6. When compiling applications using the DSL, replace any graph fragments matching the Pattern Graph with corresponding instance of Replacement Graph.

Figure 5:
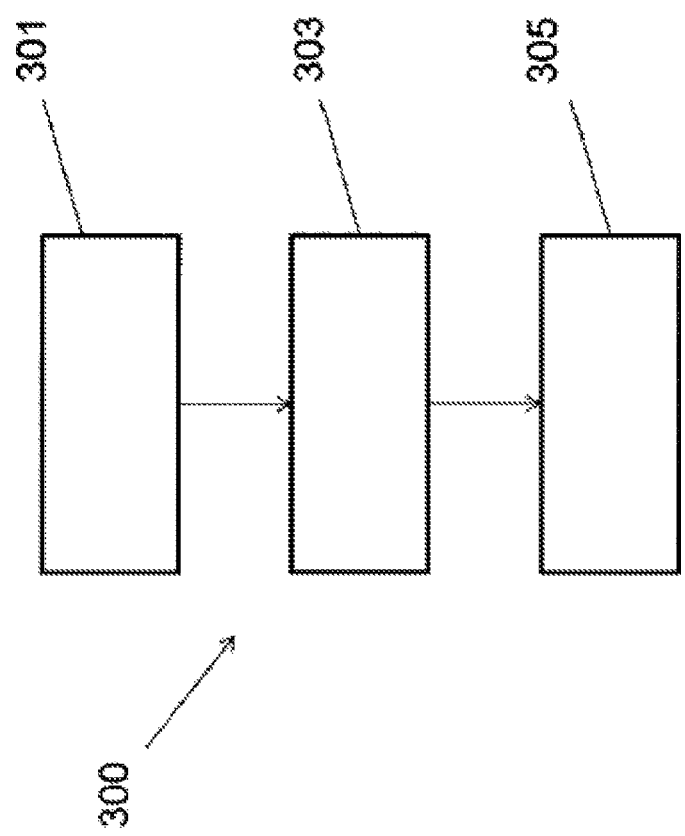
FIG. 5 shows a domain specific framework system according to an implementation form.

FIG. 5 shows a compiler 200 operable on a processor, the compiler being configured to compile a source code to a program code. The compiler comprises a pattern graph provider 201 configured to provide a pattern graph, e.g. as mentioned above, based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph, a replacement unit 203 configured, as e.g. mentioned above, to replace the pattern graph by the replacement graph assigned to the pattern graph, and a code generator 205 configured to generate the program code based on the replacement graph, as e.g. described above.

The compiler 200 can operate according to the above described implementation forms.

FIG. 5 shows a domain specific framework system 300 according to an implementation form. The domain specific framework system 300 comprises a rule specification unit 301 configured to create a set of rules in a first programming language, wherein the set of rules comprises a specific replacement rule directing a pattern graph to be replaced by a corresponding replacement graph assigned to the pattern graph, a rule components unit 303, the rule components unit comprises a plurality of pattern graphs and for each pattern graph a corresponding replacement graph assigned to the pattern graph by the rule specification unit, and a staged evaluator 305 configured to perform a staged evaluation of the set of rules and to create an intermediate representation of a source code according to the set of rules.

The domain specific framework system 300 can operate according to the above described implementation forms.

What is claimed is:
1. A method for compiling a source code to a program code for a processor, the method comprising:
compiling, by a compiler, the source code in a domain specific language (DSL) specialized to a particular application domain to the program code in a second programming language which second programming language is executable on the processor; the compiler operable on the processor to:
generating, by a pattern graph provider, a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph;
replacing the pattern graph by the replacement graph assigned to the pattern graph, wherein instances of the pattern graph are registered together with their corresponding replacement graphs in a rule component of the set of rules; and
generating the program code based on the replacement graphs;
wherein the pattern graph is generated such that the pattern graph matches the intermediate representation of the source code, wherein the pattern graph is generated:
such that a number of nodes of the first layer of nodes of the pattern graph matches a number of nodes of the first layer of nodes of the intermediate representation of the source code; and
such that the binary operations of the further layers of nodes of the pattern graph match the binary operations of the further layers of nodes of the intermediate representation of the source code,
wherein the replacement graph comprises a first layer of nodes comprising expressions in particular variables which first layer of nodes is concatenated with further layers of nodes comprising binary operations; and
wherein the replacement graph has a same number of nodes of the first layer of nodes as the pattern graph and at least one different binary operation in the further layers of nodes.

2. The method of claim 1,
wherein the pattern graph is replaced by the corresponding replacement graph when the specific replacement rule is set active in the compiling.

3. The method of claim 1, further comprising:
detecting instances of the pattern graph in the intermediate representation of the source code by looking up the rule component of the set of rules and replacing the instances of the pattern graph with their corresponding replacement graphs registered in the rule component.

4. The method of claim 1,
wherein the intermediate representation of the source code comprises a graph-based data structure representing the source code.

5. The method of claim 1,
wherein the specific replacement rule is registered as a rule component comprising the pattern graph and the replacement graph in the set of rules of the first programming language.

6. A system comprising:
a processor; and
a compiler operable on the processor;
compiling, by the compiler, the source code in a domain specific language (DSL) specialized to a particular application domain to the program code in a second programming language which second programming language is executable on the processor; the compiler operable on the processor configured to:

generating a pattern graph based on the source code, the pattern graph corresponding to an intermediate representation of the source code according to a set of rules in a first programming language, wherein the set of rules comprises a specific replacement rule directing a pattern graph to be replaced by a corresponding replacement graph assigned to the pattern graph;
replacing the pattern graph by the replacement graph assigned to the pattern graph, wherein instances of the pattern graph are registered together with their corresponding replacement graphs in a rule component of the set of rules; and
generating the program code based on the replacement graphs,
wherein the pattern graph is generated such that the pattern graph matches the intermediate representation of the source code,
wherein the pattern graph is generated:
such that a number of nodes of the first layer of nodes of the pattern graph matches a number of nodes of the first layer of nodes of the intermediate representation of the source code; and
such that the binary operations of the further layers of nodes of the pattern graph match the binary operations of the further layers of nodes of the intermediate representation of the source code,
wherein the replacement graph comprises a first layer of nodes comprising expressions, in particular variables which first layer of nodes is concatenated with further layers of nodes comprising binary operations; and
wherein the replacement graph has a same number of nodes of the first layer of nodes as the pattern graph and at least one different binary operation in the further layers of nodes.

7. The system of claim 6,
wherein the compiler operable on processor is further configured to perform a staged evaluation of the set of rules and to create the intermediate representation of the source code according to the set of rules.

8. The system of claim 6, wherein the step of generating the pattern graph based on the source code further comprises performing a staged evaluation of the first programming language, wherein a result of the staged evaluation is a program graph forming the intermediate representation of the source code.

* * * * *